(12) United States Patent
Scholz et al.

(10) Patent No.: US 9,355,414 B2
(45) Date of Patent: May 31, 2016

(54) COLLABORATIVE FILTERING MODEL HAVING IMPROVED PREDICTIVE PERFORMANCE

(75) Inventors: Martin B. Scholz, San Francisco, CA (US); George Forman, Port Orchard, WA (US); Rong Pan, Guangdong (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 381 days.

(21) Appl. No.: 12/790,844

(22) Filed: May 30, 2010

(65) Prior Publication Data
US 2011/0295762 A1 Dec. 1, 2011

(51) Int. Cl.
*G06F 7/00* (2006.01)
*G07F 17/30* (2006.01)
*G06Q 30/02* (2012.01)

(52) U.S. Cl.
CPC ............ *G06Q 30/0282* (2013.01); *G06Q 30/02* (2013.01)

(58) Field of Classification Search
CPC ... G06Q 10/00; G06Q 30/00; G06Q 30/0282; G06F 15/18; G06N 5/02
See application file for complete search history.

(56) References Cited

U.S. PATENT DOCUMENTS

| | | | |
|---|---|---|---|
| 6,655,963 B1 * | 12/2003 | Horvitz et al. | 434/236 |
| 6,839,680 B1 | 1/2005 | Liu et al. | |
| 7,624,095 B2 * | 11/2009 | Majumder | 705/7.29 |
| 2002/0161664 A1 * | 10/2002 | Shaya et al. | 705/26 |
| 2003/0101449 A1 | 5/2003 | Bentolila et al. | |
| 2006/0009994 A1 * | 1/2006 | Hogg et al. | 705/1 |
| 2007/0282670 A1 * | 12/2007 | Repasi et al. | 705/10 |
| 2008/0126176 A1 | 5/2008 | Iguchi | |
| 2008/0154878 A1 * | 6/2008 | Rose et al. | 707/5 |
| 2009/0083126 A1 * | 3/2009 | Koren et al. | 705/10 |
| 2011/0047213 A1 * | 2/2011 | Manuel | 709/204 |

OTHER PUBLICATIONS

Fenstermacher et al.; "Mining Client-Side Activity for Personalization" Department of Management Information Systems, Eller College of Business and Public Administration, University of Arizona, Jun. 2002.

Baoyao, Zhou; "Intelligent Web Usage Mining" Nanyang Technological University, Division of Information Systems, School of Computer Engineering, 2004.

Baynote Inc.: "The Collective Intelligence Platform," Online, http://www.baynote.com/technology/platform/ 2010.

Hottolink Inc.; "Recognize" Online, http://www.hottolink.co.jp/english/reconize.html, 2009.

Andrejko et al.: "User Characteristics Acquisition from Logs with Semantics" 8. Slovak University of Technology in Bratislava.

(Continued)

*Primary Examiner* — Azam Cheema
(74) *Attorney, Agent, or Firm* — Michael A. Dryja

(57) ABSTRACT

For each first entity of a subset of a number of first entities, an expected improvement of a predictive performance of a collaborative filtering model if additional ratings of the first entity in relation to a plurality of second entities were obtained is estimated. Particular first entities from the subset of the first entities of which to obtain the additional ratings in relation to the second entities are selected based at least on the expected improvements that have been determined. The additional ratings of the particular first entities in relation to the second entities are obtained.

15 Claims, 5 Drawing Sheets

(56) References Cited

OTHER PUBLICATIONS

Hongjun Lu et al: Extending a Web Browser with Client-Side Mining, Hong Kong University of Science and Technology Department of Computer Science, Clear Water Bay, Kowloon, Hong Kong, China, 2003.

Shankar et al.; "Personalized Web Search Based on Client Side Ontology", CS 498: B.Tech Project, 10. IIT Kanpur, India 2010.

Sendhikumar et al.; "Personalized ontology for web search personalization" 1. Anna University, Chennai, India, 2008.

Shahabi et al.; "Yoda an Accurate and Scalable Web based Recommendation System?" University of Southern California, Los Angeles, Sep. 2001.

Why WUBAT? Website User Behavior & Analysis Tool, Wubat, Online, http://www.wubat.com/.

Claypool et al.; "Implicit Interest Indicators", 14. Worcester Polytechnic Institute, Worcester, Computer Science Department Worcester Polytechnic Institute Worcester, MA 01609, USA., 2001.

Shahabi et al.; "A Framework for Efficient and Anonymous Web Usage Mining Based on Client-Side Tracking", 15. University of Southern California, Los Angeles, 2002.

Chattertrap; Online http://www.chattertrap.com; Jul. 20, 2010.

HSNW: SRI defense technology spawns civilian application: published Jun. 29, 2010.

Anthony Ha: Facebook investor backs Chattertrap, a personal assistant for content, Jun. 28, 2010.

Harpale et al., "Personalized active learning for collaborative filtering," Procs. of SIGIR 2008, year 2008.

Jin et al., "A Bayesian approach toward active learning for collaborative filtering," Procs. of UAI 2004, year 2004.

Yu et al., "Active learning via transductive experimental design," Procs. of ICML 2006, year 2006.

Huang, "Selectively acquiring ratings for product recommendation," Procs. of ICEC 2007, year 2007.

Boutilier et al., "Active collaborative filtering," Procs. of UAI 2003, year 2003.

Rashid et al., "Learning preferences of new users in recommender systems: An information theoretic approach," SIGKDD Explorations, year 2008.

John et al., "Static vs dynamic sampling for data mining," Procs. of KDD 1996, year 1996.

Rosset et al., "Making the most of your data: KDD cup 2007 'How many ratings' winner's report," SIGKDD Explorations, year 2007.

* cited by examiner

COLLABORATIVE FILTERING MODEL HAVING IMPROVED PREDICTIVE PERFORMANCE

BACKGROUND

Collaborative filtering is a technique that can be used in recommender systems. A recommender system is a system in which items are recommended to a user. For example, items such as films, television, video on demand, music, books, news, images, web pages, and other types of items may be recommended to a user. Collaborative filtering can be used within a recommender system to make predictions for a user based on information regarding a number of users.

DETAILED DESCRIPTION OF THE DRAWINGS

Figure 1:
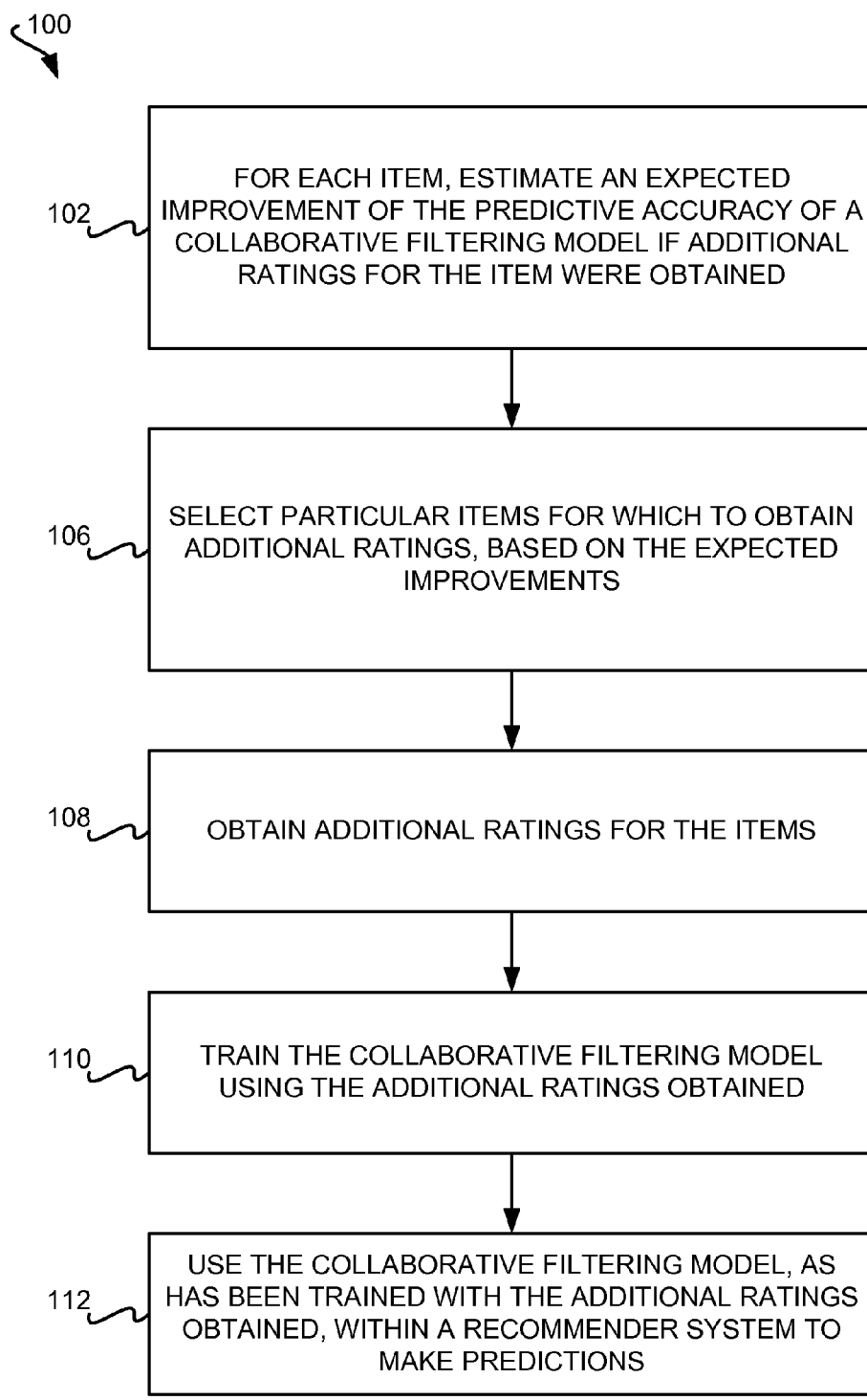
FIG. 1 is a flowchart of a method for improving the predictive accuracy of a collaborative filtering model, according to an embodiment of the disclosure.

As noted in the background section, collaborative filtering is a technique that can be employed in recommender systems. For example, based on the items that a user has rated in the past, a recommender system may recommend additional items that are of potential interest to the user. The recommender system can determine these additional items to recommend to the user by using a collaborative filtering model, based on ratings for items by this user as well as by other users, such as those with similar interests to the user in question.

For instance, each item may be rated according to a predetermined scale. The predetermined scale may be numeric, ranging from a lowest value to a highest value, where a user can provide a rating for an item equal to one of the values within the scale. For example, the user may rate books on a one-to-five star scale. Alternatively, the predetermined scale may be binary, where a user can provide a rating for an item equal to one of two values. For example, a user may rate an item "yes, I would purchase/select/view/rent/etc. this item again" or "no, I would not purchase/select/view/rent/etc. this item again." In some situations, the rating may be implicitly derived from the user's behavior. For example, the rating for an item may be derived from the length of time the user spends viewing the particular item.

There are at least two interrelated problems with recommender systems that employ collaborative filtering. First, it can be difficult to get users to take the time to rate items. Second, the predictive accuracy of the collaborative filtering model may be poor. For example, a recommender system that uses collaborative filtering may recommend additional items to a user in which the user has little interest.

More specifically, as to this second problem, it is desirable to improve the predictive accuracy of the collaborative filtering model for the users and/or items on average. The inventors have found that obtaining additional ratings from specific users and/or for specific items can improve the predictive accuracy of the collaborative filtering model for other users and/or items. However, it can be difficult to identify these specific users and/or items that will likely result in an improvement of the predictive accuracy of the collaborative filtering model for the users and/or items on average. That is, it can be difficult to identify the specific users and/or items that will result in an improvement of the predictive accuracy of the collaborative filtering model as a whole.

For example, a user who rates every item highly may not be a good candidate from whom to obtain additional ratings. This is because the predictive accuracy of the collaborative filtering model will typically not be improved for other users. As another example, an item that has low popularity may not be a good candidate for which to obtain additional ratings. This is because, while the predictive accuracy of the collaborative filtering model may be improved for this unpopular item, it will typically not be improved for other items.

Embodiments of the disclosure improve the predictive accuracy of a collaborative filtering model not just for particular users from whom additional ratings are obtained and/or not just for particular items for which additional ratings are obtained. For example, particular users can be selected so that the predictive accuracy of the collaborative filtering model is improved for other users as well, even though just the particular users provide additional ratings. As another example, particular items can be selected so that the predictive accuracy of the collaborative filtering model is improved for other items as well, even though additional ratings are provided just for the particular items.

Embodiments of the disclosure can also improve the likelihood that users will actually provide these additional ratings. Additional ratings are obtained just from particular users and/or just for particular items. As such, the number of additional ratings to be acquired to improve the predictive accuracy of the collaborative filtering model as a whole is reduced. Therefore, users may be more willing to provide additional ratings, since the number of requests for them to provide additional ratings is reduced.

FIG. 1 shows a method 100 for improving the predictive accuracy of a collaborative filtering model, according to an embodiment of the disclosure. The method 100 is specifically described in relation to identifying particular items for which additional ratings are obtained to improve the predictive accuracy of the collaborative filtering model for items on average. However, the method 100 is also applicable to identifying particular users from which additional ratings are obtained to improve the predictive accuracy of the collaborative filtering model for items on average.

The method 100 is performed by a computing device, such as a computer. For instance, a computer-readable data storage medium can store one or more computer programs that when executed by a processor of such a computing device cause the method 100 to be performed. The computer-readable data storage medium can be or include a non-volatile storage device such as a hard disk drive and/or another type of non-volatile storage device, and/or a volatile storage device such as a semiconductor dynamic random access memory and/or another type of volatile storage device.

For each given item of a subset of the items, the method 100 estimates an expected improvement of the predictive accuracy of a collaborative filtering model for users and/or items on average if additional ratings for the given item were obtained (102). It is noted that part 102 is performed just for items that have a minimum threshold number of ratings, such as five, ten, fifty, or one-hundred ratings in various embodiment. An item having too few ratings, such as a dozen ratings, may result in a skewed determination of the expected improvement of the predictive accuracy of the collaborative filtering model as a whole. As such, insofar as part 102 is been described in relation to "each item," in actuality "each item" means each item that has a minimum threshold number of ratings. Furthermore, it is noted that the subset of the items can include all the items in one embodiment.

Figure 2:
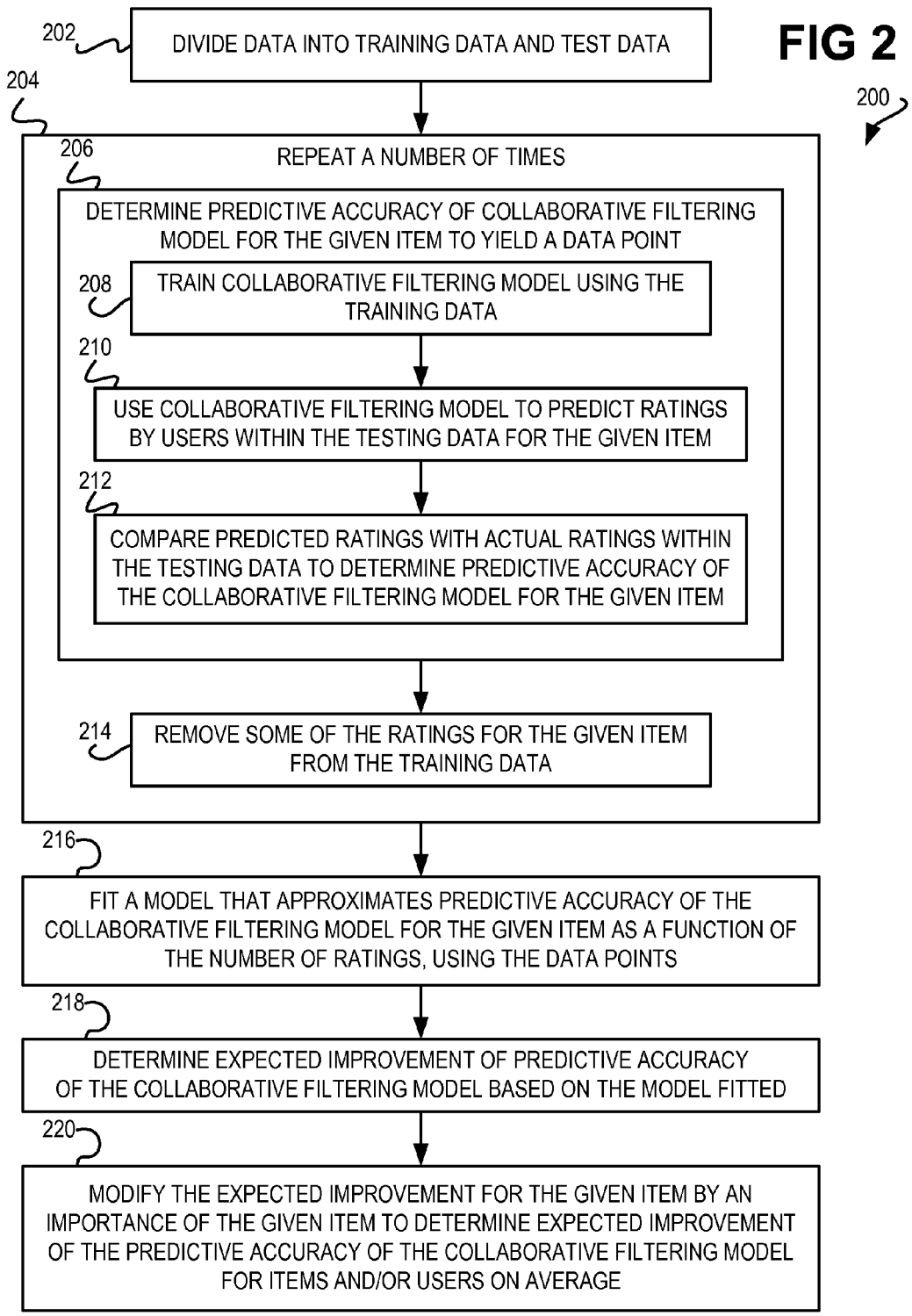
FIG. 2 is a flowchart of a method for estimating an expected improvement of the predictive accuracy of the collaborative filtering model if additional ratings for a given item were obtained, according to an embodiment of the disclosure.

FIG. 2 shows a method 200 for performing part 102 of the method 100 to estimate the expected improvement of the predictive accuracy of the collaborative filtering model for users and/or items on average if additional ratings for a single given item were obtained, according to an embodiment of the disclosure. As an overview, the method 200 initially determines the expected improvement of the predictive accuracy of the collaborative filtering model just for the given item if additional ratings for the given item were obtained. However, this expected improvement is then modified based on the importance of the given item relative to other items. In this way, the expected improvement of the predictive accuracy of the collaborative filtering model for users and/or items on average if additional ratings for the given item were obtained is determined. That is, by modifying the expected improvement for the given item by the item's importance, the expected improvement for users and/or items on average is obtained.

Available historical data encompassing ratings for the items by users is divided into two data sets: testing data and training data (202). The training data is used to train the collaborative filtering model. The testing data is then used to determine the predictive accuracy of the collaborative filtering model, as trained using the training data. In general, after the collaborative filtering model has been trained using the training data, each user included in the testing data is input into the collaborative filtering model, and the predicted rating for the given item correspondingly output by the collaborative filtering model is compared to the actual rating for the given item by the user, as specified within the testing data. The testing data in part 202 includes just ratings for the given item in relation to which the method 200 is being performed, and not ratings for other items. By comparison, the training data includes ratings for the given item as well as for other items.

For example, the historical data may include 1,000 ratings for the given item by distinct users, as well as ratings for other items by the users. The 1,000 ratings for the given item may be divided into training data encompassing 750 ratings, and testing data encompassing 250 ratings. The training data also include the ratings for the other items by the users. As such, the training data is used to train the collaborative filtering model, and the 250 ratings for the given item—i.e., the testing data—are used to test the predictive accuracy of the trained collaborative filtering model for the given item.

Generally, to estimate the predictive accuracy of the collaborative filtering model if a number of additional items were obtained for the given item, the method 200 decreases the number of ratings for the given item in the training data, and retrains the collaborative filtering model with this reduced number of ratings. The method 200 then tests the predictive accuracy of the resulting trained collaborative filtering model for the given item using the reduced testing data. This process is repeated a number of times, such as five times in one embodiment, where each time a number of ratings for the given item are removed from the training data.

By performing this process, a number of data points are acquired, where each data point specifies the predictive accuracy of the collaborative filtering model for the given item for a different number of ratings for the given item. Fitting a regression model that approximates the predictive accuracy of the collaborative filtering model as a function of the number of ratings for the given item, based on these data points, yields the expected improvement of the predictive accuracy of the collaborative filtering model for the given item if a number of additional ratings were obtained for the given item. The regression model is not to be confused with the collaborative filtering model itself. As noted above, this expected improvement for the given item is modified by the given item's importance relative to the importance of other items. As such, the expected improvement of the predictive accuracy of the collaborative filtering model for users and/or items on average if a number of additional ratings for the given item were obtained, such as one or five additional ratings, is determined.

More specifically, then, the method 200 repeats the following a number of times equal to the number of data points desired (204). The predictive accuracy of the collaborative filtering model is determined for the given item to yield a data point (206). The data point specifies the predictive accuracy of the collaborative filtering model of the given item for the number of ratings of the given item within the training data.

In one embodiment, part 206 is achieved as follows. As noted above, the collaborative filtering model is trained using the training data (208), and the trained collaborative filtering model is then used to predict ratings for the given item by the users within the testing data (210). The predicted ratings output by the collaborative filtering model for the given item are compared to the actual ratings for the given item by the users within the testing data to determine the predictive accuracy of the collaborative filtering model for the given item (212), and thus the data point.

For example, the testing data may indicate that a given user may have actually rated the given item as one a binary scale. By comparison, the collaborative filtering model may predict that this user will rate the item as zero, in which case the rating is incorrect. However, for another user, the testing data and the predicted rating may agree. Given a number of actual ratings for the given item by distinct users within the testing data, the percentage of correct predictions can be used as the predictive accuracy of the collaborative filtering model for the given item. However, other techniques can be used to characterize the predictive accuracy of the collaborative filtering model, such as by measuring the mean-squared error or mean absolute error, for instance.

Performing parts 208 and 210 yields one data point of the predictive accuracy of the collaborative filtering model of the given item for the current number of ratings for the given item within the training data. To obtain the next data point, some of the ratings for the given item are removed from the training data (214), and part 206 is performed again for this smaller number of ratings for the given item within the training data. By performing parts 206 and 214 repeatedly, then, a number of data points are acquired, where each data point specifies the predictive accuracy of the collaborative filtering model of the given item for a different number of ratings of the given item within the training data.

The ratings removed from the training data in part 214 are selected at random. For instance, in one embodiment, different random subsets are removed in independent trials. As such, multiple data points are obtained for each given number of ratings that are removed in this embodiment.

In a different embodiment, part 206—including parts 208, 210, and 212—is instead performed using a cross-validation technique. In this embodiment, each of a number of equal partitions, such as four partitions, of the available historical data is used as a test set for the collaborative filtering model trained within the remaining historical data, minus the number of ratings that have been removed in part 214. In such an embodiment, part 202 is not performed.

The method 200 fits a regression model that approximates the predictive accuracy of the collaborative filtering model for the given item as a function of the number of ratings for the given item within the training data, based on the data points that have been obtained (216). Linear regression or another technique can be used to determine a function that fits the data points. The resulting function or model thus provides as output the predictive accuracy of the collaborative filtering model for the given item based on the number of ratings for the given item as input.

The expected improvement of the predictive accuracy of the collaborative filtering model for the given item if additional ratings for the given item were obtained, is determined using the regression model that has been fit to the data points in part 216 (218). The expected improvement for the given item is extrapolated from the data points by using the regression model. For instance, the largest number of ratings of any data point may be increased by a specified number or percentage. This resulting number of ratings can then be input into the regression model to receive as output from the regression model the expected improvement of the predictive accuracy of the collaborative filtering model for the given item.

Because the expected improvement of the predictive accuracy of the collaborative filtering model for users and/or items on average if additional ratings for the given item were obtained is what is desired, the expected improvement determined in part 218 is modified (220). Specifically, the expected improvement for the given item is modified by the importance of the given item relative to the other items, such as by multiplying the expected improvement by the given item's importance. The importance of the given item may be its popularity relative to the popularity of the other items, for instance. By modifying the expected improvement for the given item based on the given item's importance, the expected improvement of the predictive accuracy of the collaborative filtering model for users and/or items on average if additional ratings for the given item were obtained, is determined.

Figure 3:
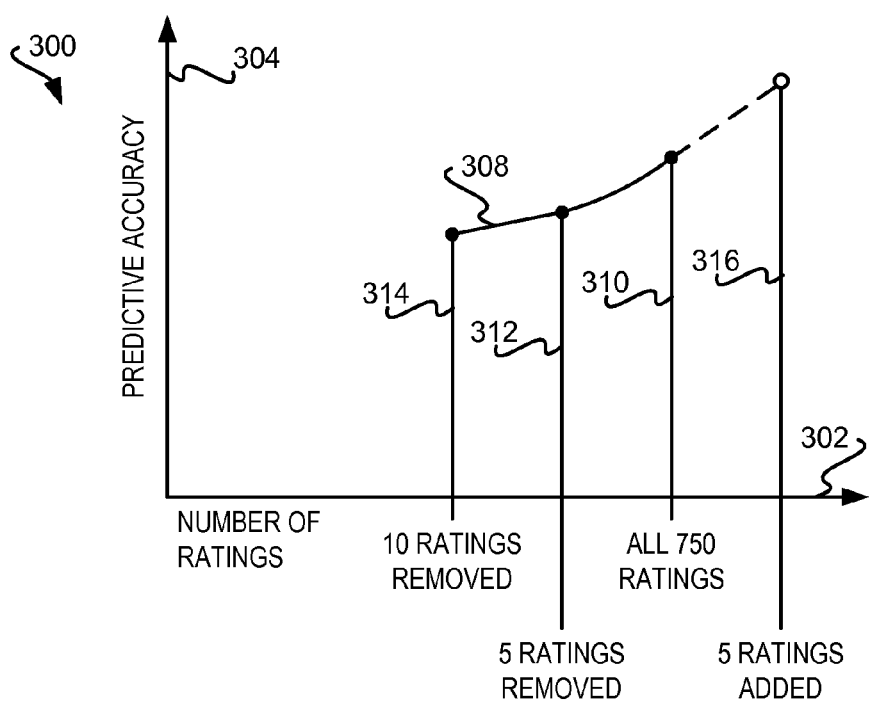
FIG. 3 is a graph that illustratively depicts exemplary performance of the method of FIG. 2, according to an embodiment of the disclosure.

FIG. 3 shows a rudimentary graph 300 that illustratively depicts exemplary performance of the method 200, according to an embodiment of the disclosure. The x-axis 302 denotes the number of ratings for a given item on which basis the collaborative filtering model has been trained, whereas the y-axis 304 denotes the predictive accuracy of the resultantly trained collaborative filtering model for the given item. The curve 308 corresponds to the given item for which the method 200 has been performed. The curve 308 from the left endpoint up to the line 310 (inclusive) is based on the data points acquired by performing the method 200 for the given item.

Three representative data points are explicitly shown in FIG. 3. The first data point, corresponding to the line 310, represents the predictive accuracy of the collaborative filtering model for the given item when the model was trained with none of the ratings for the given item having been removed from the training data. In the example of FIG. 3, the training data initially includes 750 ratings for the given item. The second data point, corresponding to the line 312, represents the predictive accuracy for the given item when the collaborative filtering model was trained after a number of ratings for the given item were removed from the training data, such as when five ratings were removed in the example of FIG. 3. The third data point, corresponding to the line 314, represents the predictive accuracy for the given item when the model was trained after additional ratings for the given item were removed from the training data, such as when five additional ratings were removed to result in a total of ten ratings having been removed.

To the right of the line 310, the curve 308 is extrapolated using the regression model, and represents the estimated predictive accuracy of the collaborative filtering model if additional items were obtained. For example, where the line 310 corresponds to the largest number of ratings on which basis the collaborative filtering model has been trained, the line 316 corresponds to the total number of ratings if a number of additional ratings were obtained, such as five ratings. The expected improvement of the predictive accuracy of the collaborative filtering model for the given item if such additional ratings for the given item were obtained is thus the change in the curve 308 along the y-axis 304 from the line 310 to the line 316.

As has been described, the method 200 of FIG. 2 estimates the expected improvement of the predictive accuracy of the collaborative filtering model for users and/or items on average if additional ratings for a given item were obtained by multiplying the expected improvement for just the given item by the importance of the given item. The method 200 thus first determines the expected improvement of the predictive accuracy of the collaborative filtering model for just the given item if additional ratings for the given item were obtained. The method 200 then multiplies this expected improvement by the importance of the given item, to yield the expected improvement of the predictive accuracy of the collaborative filtering model for users and/or items on average.

Figure 4:
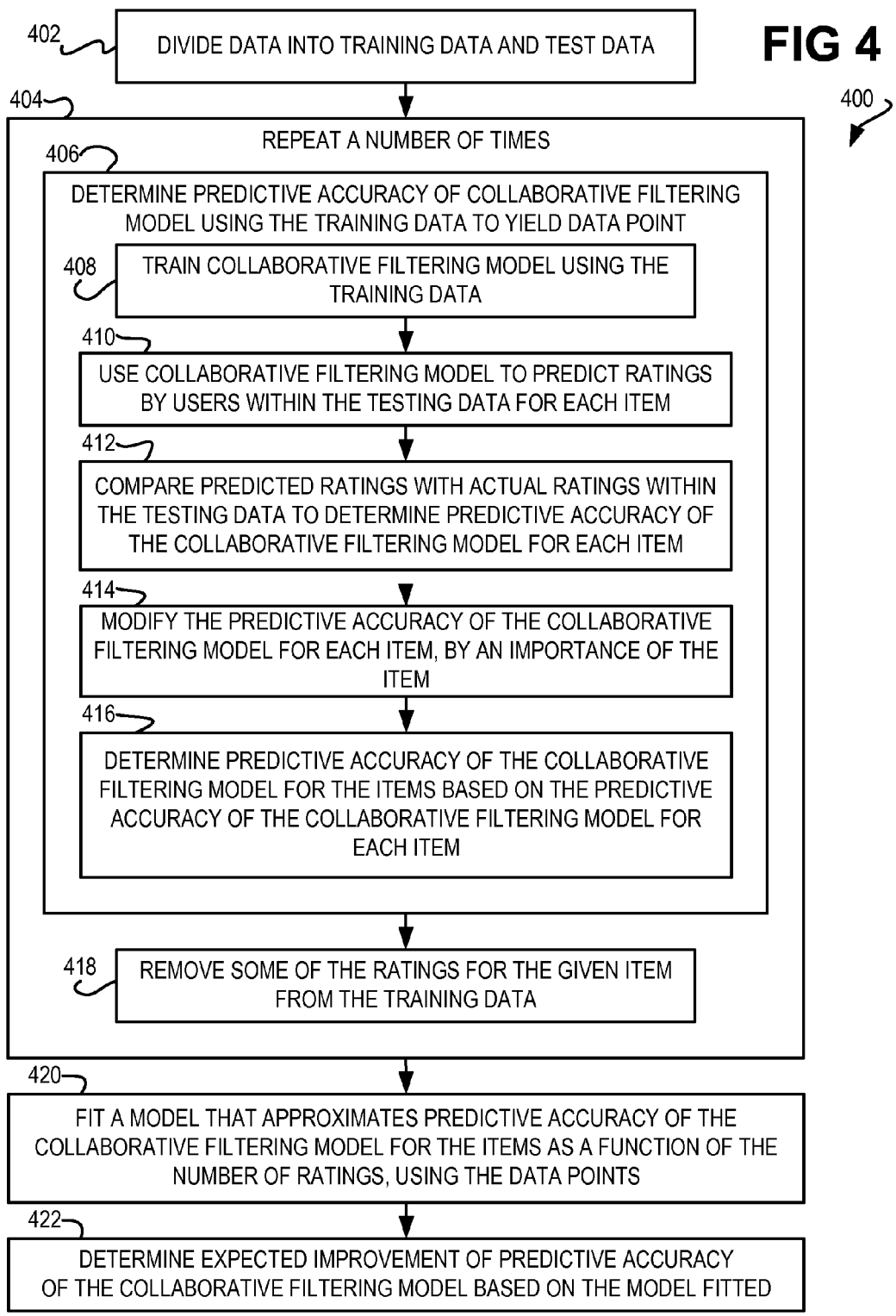
FIG. 4 is a flowchart of a method for estimating an expected improvement of the predictive accuracy of the collaborative filtering model if additional ratings for a given item were obtained, according to another embodiment of the disclosure.

FIG. 4 shows a method 400 that can be performed to estimate the expected improvement of the predictive accuracy of a collaborative filtering model if additional ratings for a given item were obtained in part 102 of the method 100 of FIG. 1, according to another embodiment of the disclosure. The method 400 generally differs from the method 200 in that the method 400 determines the expected improvement of the predictive accuracy of the collaborative filtering model not just for the given item in question if additional ratings for the given item were obtained, as is the case with the method 200. That is, the method 400 estimates the expected improvement of the predictive accuracy for every item that distinct users have already rated if additional ratings for the given item were obtained.

Available historical data encompassing ratings for the items is divided into two data sets: testing data and training data (402). The training data is used to train the collaborative filtering model. The testing data is then used to determine the predictive accuracy of the collaborative filtering model for each item—and not just for the given item—as trained using the training data. In general, after the collaborative filtering model has been trained using the training data, each user included in the testing data is input into the collaborative filtering model, and the predicted rating for each item correspondingly output by the collaborative filtering model is compared to the actual rating of the item by the user, as specified within the testing data. The testing data in part 402 thus includes ratings for each item, and not just ratings for the given item in relation to which the method 400 is being performed.

For example, the historical data may include between 500 and 1,500 ratings for each item by distinct users, including 1,000 ratings for the given item. Some of the ratings for each item are assigned to the training data and other ratings for each item are assigned to the testing data. For example, 75% of the ratings for each item may be assigned to the training data, and 25% of the ratings for each item may be assigned to the testing data. As such, the training data includes 750 ratings for the given item, and the testing data includes 250 ratings for the given item.

Generally, to estimate the predictive accuracy of the collaborative filtering model as a whole if a number of additional items were obtained for the given item, the method 400 decreases the number of ratings for the given item in the training data, and retrains the collaborative filtering model with this reduced number of ratings. The method 400 tests the predictive accuracy of the resulting trained collaborative filtering model for each item using the testing data. This process is repeated a number of times, such as five times in one embodiment, where each time a number of ratings for the given item are removed from the training data.

As one example, there may be 1,000 different items, and the predictive accuracy of the collaborative filtering model for each item is determined where the model was trained with none of the available ratings for the given item having been removed. As such, a vector having 1,000 elements may be generated, where each element corresponds to the predictive accuracy of the collaborative filtering model for a particular item, and where the model was trained with none of the available ratings for the given item having been removed. The elements of the vector are combined to yield the overall predictive accuracy of the collaborative filtering model as a whole, where the model was trained with none of the available ratings for the given item having been removed. This process is repeated a number of times, such as twenty-five times in one embodiment, where each time a number of ratings for the given item are removed from the training data.

By performing this process, a number of data points are acquired, where each data point specifies the predictive accuracy of the collaborative filtering model as a whole for a different number of ratings for the given item. Fitting a regression model that approximates the predictive accuracy of the collaborative filtering model as a whole as a function of the number of ratings for the given item, based on these data points, yields the expected improvement of the predictive accuracy of the collaborative filtering model as a whole if a number of additional ratings were obtained for the given item. This expected improvement corresponds to the expected improvement of the predictive accuracy of the collaborative filtering model for users and/or items on average if a number of additional ratings for the given item were obtained, such as one or five additional ratings.

More specifically, then, the method 400 repeats the following a number of times equal to the number of data points desired (404). The predictive accuracy of the collaborative filtering model as a whole is determined to yield a data point (406). The data point for each item specifies the predictive accuracy of the collaborative filtering model as a whole, for the number of ratings of the given item within the training data.

In one embodiment, part 406 is achieved as follows. As noted above, the collaborative filtering model is trained using the training data (408). The trained collaborative filtering model is then used to predict ratings by users within the testing data for each item (410). The predicted ratings output by the collaborative filtering model for each item are compared to the actual ratings for each item by the users within the testing data to determine the predictive accuracy of the collaborative filtering model for each item (412).

The result of part 412 may be a vector having a number of elements. Each element corresponds to the predictive accuracy of the trained collaborative filtering model for a different item. In one embodiment, the predictive accuracy of the trained collaborative filtering model for each item—that is, each element of the vector—is modified by an importance of the item (414). For example, the vector element corresponding to an item may be multiplied by the importance of the item, relative to the importance of the other items.

The predictive accuracy of the collaborative filtering model as a whole is determined based on the predictive accuracy of the collaborative filtering model for each item (416). That is, the elements of the vector, as may have been modified in part 414, are combined to yield a single value. The elements of the vector may be added together in one embodiment. Performing parts 408, 410, 412, 414, and 416 thus yields one data point of the predictive accuracy of the collaborative filtering model as a whole for the current number of ratings for the given item within the training data.

To obtain the next data point, some of the ratings for the given item are removed from the training data (418), and part 406 is performed again for this smaller number of ratings for the given item within the training data. By performing parts 406 and 418 repeatedly, then, a number of data points are acquired, where each data point specifies the predictive accuracy of the collaborative filtering model of the items (i.e., the predictive accuracy of the collaborative filtering model as a whole) for a different number of ratings of the given item within the training data. In a different embodiment, part 406—including parts 408, 410, 412, 414, and 416—is instead performed using a cross-validation technique. In such an embodiment, part 402 is not performed.

The method 400 fits a regression model that approximates the predictive accuracy of the collaborative filtering model for the items (i.e., the predictive accuracy of the collaborative filtering model as a whole) as a function of the number of ratings for the given item within the training data (420), based on the data points that have been obtained. Linear regression or another technique can be used to determine a function that fits the data points. The resulting function or model thus provides as output the predictive accuracy of the collaborative filtering model as a whole, based on the number of ratings for the given item as input.

The expected improvement of the predictive accuracy of the collaborative filtering model as a whole if additional ratings for the given item were obtained, is determined using the regression model that has been fit to the data points in part 420 (422). The expected improvement may be extrapolated from the data points by using the regression model. For instance, the largest number of ratings of any data point may be increased by a specified number or percentage. This resulting number of ratings can then be input into the regression model to receive as output from the regression model the expected improvement of the predictive accuracy of the collaborative filtering model as a whole.

Referring back to FIG. 1, once the expected improvement of the predictive accuracy of the collaborative filtering model has been estimated if additional ratings for each item were obtained in part 102, such as by performing the method 200 or 400 for each item, particular items are selected (106). The method 100 selects the particular items for which additional ratings are to be obtained. The method 100 selects these particular items based on the expected improvements in the predictive accuracy of the collaborative filtering model that would result if additional ratings for these particular items were obtained. For instance, a predetermined number of items that are expected to result in the greatest improvement of the predictive accuracy of the collaborative filtering model may be selected. As another example, the items that are expected to result in improvement of the predictive accuracy of the collaborative filtering model by more than a predetermined threshold may be selected.

Additional ratings for the items that have been selected are then obtained from the users (108). In one embodiment, additional ratings for items other than the items that have been selected in part 106 are not obtained. As noted above, however, obtaining the additional ratings for the items that have been selected is likely to result in an improvement of the predictive accuracy of the collaborative filtering model for items and/or users on average.

The method 100 therefore selects particular items that are likely to improve the predictive accuracy of the collaborative filtering model as a whole. The method 100 can result in improving predictive accuracy of the collaborative filtering model for items and/or users on average, and not just for the particular items for which additional ratings have been obtained from users in part 108. This is a result of the selection process employed in part 106.

Additional ratings for the particular items selected in part 106 can be obtained from the users in part 108 as follows. A round robin-based approach may be utilized to query the users for the additional ratings for the particular items. For example, a first user may be queried to rate one of the particular items that this user has not rated before. Once the first user has rated one of these particular items, or after a predetermined length of time has elapsed or if the user declines to rate one of the particular items, a second user is queried to rate one of the particular items that the second user has not rated before.

This process continues until each user has had an opportunity to rate one of the particular items, and thereafter the process is repeated again with the first user. Such a round robin-based approach is useful, because it can ensure that there is a relatively high amount of diversity as to which users provide the additional ratings for the particular items. That is, this approach can prevent a relatively small number of users providing the additional ratings for the particular items.

Additional ratings for the particular items selected in part 106 can also be obtained from the users in part 108 as follows. For each user, specific items of the particular items for which the user is likely to be able to or willing to provide additional ratings are determined, and the user is queried to rate just these specific items, and not the other particular items. This approach can result in a user more likely being interested in providing additional ratings, because the user is not requested to rate particular items in which he or she likely has little interest, which may otherwise result in the user becoming bored or disinterested in providing any additional ratings at all.

For example, the particular items may be books having a variety of different subject matters. A given user may, based on his or her previous purchases, be determined to be interested primarily in biographies, and to be disinterested in fiction. Therefore, this user is queried just to provide ratings for the particular items that are biographies, and not to provide ratings for fictional works. As such, the user is more likely to provide additional ratings for one or more of the particular items. If, by comparison, the user were first queried to provide a rating for a work of fiction, the user may become disinterested, and request that no further queries be proffered, even if the next query would have been for a biography.

The method 100 can obtain the additional ratings in conjunction with a computing system. For example, the computing device performing the method 100 may be a server computing device that is communicatively connected to client computing devices of users over a network, such as the Internet. The server computing device may transmit a web page to a client computing device over the network for displaying on a web browsing computer program of this computing device. Via this web page, the user of the client computing device can be requested to provide an additional rating of a particular item. The user provides the additional rating by making an appropriate selection on the web page, where this selection is transmitted from the client computing device over the network back to the server computing device.

The method 100 can ultimately train the collaborative filtering model using the additional ratings obtained (110), in addition to the ratings previously included within the training data, and then use the newly trained collaborative filtering model within a recommender system to make predictions (112). That is, a recommender system that employs the collaborative filtering model can use the collaborative filtering model, as has been trained with the additional ratings as well as the ratings previously included within the training data, to provide more accurate recommendations. Specifically, the recommender system can provide users with more accurate item recommendations.

For example, a movie rental recommender system provides movie recommendations to users. When employing a collaborative filtering system, such a recommender system recommends movies to a given user based on the movies that this user previously rated, as well as based on the movie ratings of other similar users. Therefore, the recommender system can provide more accurate movie recommendations to users, due to the additional ratings that have been obtained in part 108.

Figure 5:
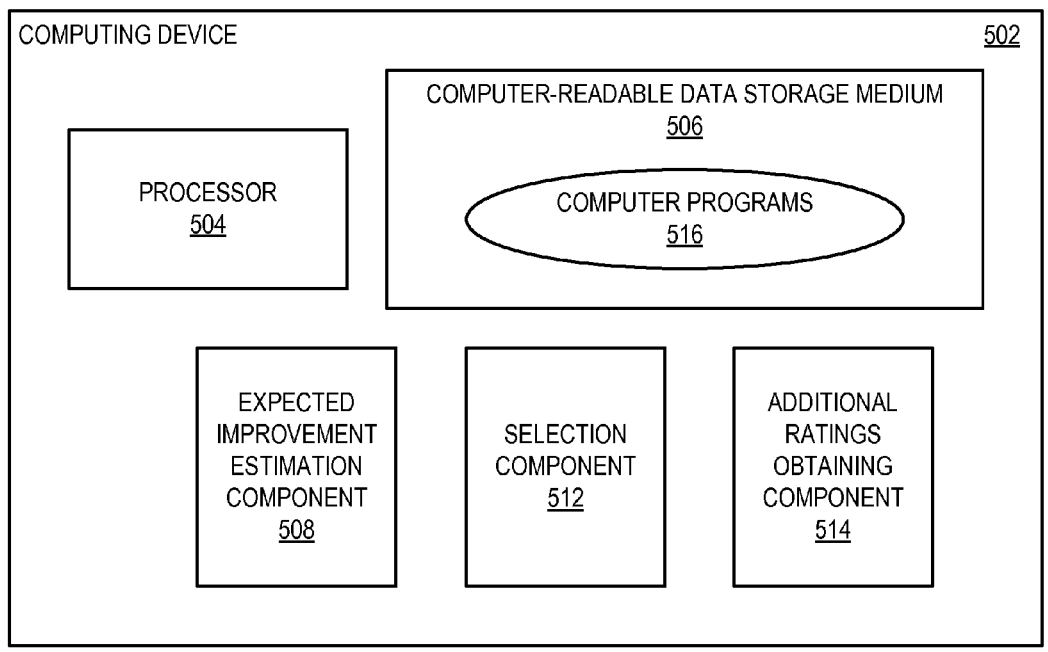
FIG. 5 is a diagram of a rudimentary system, according to an embodiment of the disclosure.

In conclusion, FIG. 5 shows a rudimentary system 500, according to an embodiment of the disclosure. The system 500 is implemented in FIG. 5 as a computing device 502. However, in another embodiment, the system 500 may be implemented over a number of computing devices 502. The computing device 502 includes a processor 504, a computer-readable data storage medium 506, and components 508, 512, and 514. The computing device 502 can and typically does include other hardware, in addition to the processor 504 and the computer-readable data storage medium 506. The computing device 502 can also include other components, in addition to and/or in lieu of the components 508, 512, and 514.

The computer-readable data storage medium 506 can be or include non-volatile computer-readable data storage media and/or volatile computer-readable data storage media. An example of a non-volatile computer-readable data storage medium is a hard disk drive, whereas an example of a volatile computer-readable data storage medium is a semiconductor dynamic random access memory. The computer-readable data storage medium 506 stores one or more computer programs 516 that are executable by the processor 504. The components 508, 512, and 514 are said to be implemented by the computer programs 516. That is, the computer programs 516 are suitably coded so that execution of the programs 516 by the processor 504 results in the components 508, 512, and 514 performing their respective functions.

The component 508 is an expected improvement estimation component. The component 508 performs part 102 of the method 100, and thus estimates the expected improvement of the predictive accuracy of a collaborative filtering model as a whole if additional ratings for each item were obtained. The component 512 is a selection component. The component 512 performs part 106 of the method 100, and thus selects particular items for which to obtain additional ratings. Finally, the component 514 is an additional ratings obtaining component. The component 514 performs part 108 of the method 100, and thus obtains additional ratings for the particular items that have been selected.

As noted above, embodiments of the disclosure have been described in relation to obtaining additional ratings for particular items. However, in another embodiment, additional ratings from particular users can be obtained. In this embodiment, the expected improvement of the predictive accuracy of the collaborative filtering model as a whole if additional ratings were obtained from each user is estimated. The importance of each user may in one embodiment be the number of ratings for items that the user in question has already provided. As such, particular users are selected from whom to obtain additional ratings, and such additional ratings are then obtained.

It is also noted that what is referred to as a user can include more than one user, and what is referred to as an item can include more than one item. For instance, a user as this term is used herein can refer to a set of users, and an item as this term is used herein can refer to a set of items. For example, a user may refer to a group of users, such as the employees of a company; the students, teachers, and/or other users of a school; a group of people that share a common geographic area; and so on. As another example, an item may refer to a group of movies within the same genre or series; a group of books by the same author; all milk products; all various sizes of 2%-fat milk; and so on.

Furthermore, more generally, embodiments of the disclosure pertain to first entities and second entities, where as one example the first entities may be users and the second entities may be items, and as another example the first entities may be items and the second entities may be users. In such embodiments, the expected improvement of the predictive accuracy of the collaborative filtering model as a whole if additional ratings of each first entity in relation to the second entities were obtained is estimated. The importance of each first entity can also be determined. Particular first entities are then selected, and additional ratings of these particular first entities in relation to the second entities are obtained.

It is finally noted that embodiments of the disclosure pertain most generally to improving the predictive performance of a collaborative filtering model. As described herein, one type of such predictive performance is predictive accuracy of such a collaborative filtering model. Another type of predictive performance is the error of a collaborative filtering model. That is, in such an embodiment, the error of the collaborative filtering model is improved by reducing this error.

We claim:

1. A method comprising:
   for each first entity of a subset of a plurality of first entities, estimating by a computing device an expected improvement of a predictive performance of a collaborative filtering model constructed from training data including a plurality of ratings of the first entity in relation to the second entities and that has a predictive accuracy resulting from being tested against testing data, if additional ratings of the first entity in relation to a plurality of second entities were obtained, by:
   removing a number of the ratings of the first entity in relation to the second entities from the training data;
   constructing a reduced collaborative filtering model from the training data from which the number of the ratings have been removed;
   testing the reduced collaborative filtering model against the testing data to determine a predictive accuracy thereof;
   determining the expected improvement based on a degradation of the predictive accuracy of the reduced collaborative filtering model compared to the predictive accuracy of the collaborating filtering model;
   selecting by a computing device particular first entities from the subset of the first entities of which to obtain the additional ratings in relation to the second entities, based at least on the expected improvements that have been determined; and
   obtaining a number of the additional ratings of the particular first entities in relation to the second entities based on the number of the ratings that were removed from the training data.

2. The method of claim 1, wherein the first entities are items and the second entities are users,
   such that the expected improvement of the predictive performance of the collaborative filtering model if additional ratings for each item were obtained is estimated,
   such that particular items are selected for which to obtain the additional ratings, based at least on the expected improvements that have been determined,
   and such that the additional ratings for the particular items are obtained.

3. The method of claim 1, wherein the first entities are users and the second entities are items,
   such that the expected improvement of the predictive performance of the collaborative filtering model if additional ratings were obtained from each user is estimated,
   such that particular users are selected from whom to obtain the additional ratings, based at least on the expected improvements that have been determined,
   and such that the additional ratings are obtained from the particular users.

4. The method of claim 1, wherein the additional ratings of just the particular first entities in relation to the second entities are obtained, such that the additional ratings of the first entities that are not the particular first entities are not obtained.

5. The method of claim 1, wherein, for each given first entity, estimating the expected improvement of the predictive performance of the collaborative filtering model comprises:
   dividing data having a number of ratings of the first entities in relation to the second entities into training data and test data, the test data including just ratings of the given first entity in relation to the second entities;
   repeating a plurality of times,
      determining a predictive performance of the collaborative filtering model for the given first entity using the training data and the test data, to yield a data point of the predictive performance of the collaborative filtering model for the given first entity by the number of ratings of the given first entity;
      removing some of the ratings of the given first entity from the training data;
   fitting a regression model that approximates the predictive performance of the collaborative filtering model for the given first entity as a function of the number of ratings of the given first entity in relation to the second entities, using the data points; and,
   determining the expected improvement of the predictive performance of the collaborative filtering model for the given first entity based on the regression model.

6. The method of claim 5, wherein, for each given first entity, estimating the expected improvement of the predictive performance of the collaborative filtering model further comprises:
   modifying the expected improvement of the predictive performance of the collaborative filtering model for the given first entity based on an importance of the given first entity, to yield the expected improvement of the predictive performance of the collaborative filtering model as a whole.

7. The method of claim 6, wherein modifying the expected improvement of the predictive performance of the collaborative filtering model based on the importance of the given first entity comprises multiplying the expected improvement by the importance of the given first entity.

8. The method of claim 1, wherein, for each given first entity, estimating the expected improvement of the predictive performance of the collaborative filtering model comprises:
dividing data having a number of ratings of multiple first entities in relation to multiple second entities into training data and test data;
repeating a plurality of times,
determining a predictive performance of the collaborative filtering model as a whole using the training data and the test data, to yield a data point of the predictive performance of the collaborative filtering model by the number of ratings of the given first entity;
removing some of the ratings of the given first entity from the training data;
fitting a model that approximates the predictive performance of the collaborative filtering model as a whole as a function of the number of ratings of the given first entity in relation to the second entities, using the data points; and,
determining the expected improvement of the predictive performance of the collaborative filtering model as a whole based on the model.

9. The method of claim 8, wherein determining the predictive performance of the collaborative filtering model as a whole using the training data and the test data comprises:
training the collaborative filtering model using the training data;
determining a predictive performance of the collaborative filtering model for each first entity; and,
combining the predictive performance of the collaborative filtering model for each first entity to yield the predictive performance of the collaborative filtering model as a whole.

10. The method of claim 9, wherein determining the predictive performance of the collaborative filtering model as a whole using the training data and the test data further comprises, prior to combining the predictive performance of the collaborative filtering model for each first entity:
modifying the predictive performance of the collaborative filtering model for each first entity based on an importance of the first entity.

11. The method of claim 1, wherein the first entities are items and the second entities are users, such that the particular first entities are particular items,
and wherein obtaining the additional ratings of the particular entities in relation to the second entities comprises querying the users for the additional ratings for the particular items using a round robin-based approach.

12. The method of claim 1, wherein the first entities are items and the second entities are users, such that the particular first entities are particular items,
and wherein obtaining the additional ratings of the particular entities in relation to the second entities comprises, for each user:
determining specific items of the particular items for which the user is likely to be able or willing to provide the additional ratings; and,
querying the user for the additional ratings for just the specific items.

13. The method of claim 1, further comprising:
training the collaborative filtering model using a plurality of ratings of the particular first entities in relation to the second entities, including the additional ratings that have been obtained; and,
using the collaborative filtering model, as trained, to make predictions.

14. A system comprising:
a processor;
a computer-readable data storage medium to store one or more computer programs that are executable by the processor;
a first component implemented by the computer programs to, for each first entity of a subset of a plurality of first entities, estimate an expected improvement of a predictive performance of a collaborative filtering model constructed from training data including a plurality of ratings of the first entity in relation to the second entities and that has a predictive accuracy resulting from being tested against testing data, if additional ratings of the first entity in relation to a plurality of second entities were obtained, by:
removing a number of the ratings of the first entity in relation to the second entities from the training data;
constructing a reduced collaborative filtering model from the training data from which the number of the ratings of the first entity in relation to the second entities have been removed;
testing the reduced collaborative filtering model against the testing data to determine a predictive accuracy of the reduced collaborative filtering model;
determining the expected improvement based on a degradation of the predictive accuracy of the reduced collaborative filtering model compared to the predictive accuracy of the collaborative filtering model;
a second component implemented by the computer programs to select particular first entities from the subset of the first entities of which to obtain the additional ratings in relation to the second entities, based at least on the expected improvements that have been determined; and,
a third component implemented by the computer programs to obtain a number of the additional ratings of the particular first entities in relation to the second entities based on the number of the ratings that were removed from the training data.

15. A non-transitory computer-readable data storage medium having one or more computer programs stored thereon, wherein execution of the computer programs by a processor causes a method to be performed, the method comprising:
for each first entity of a subset of a plurality of first entities, estimating by a computing device an expected improvement of a predictive performance of a collaborative filtering model constructed from training data including a plurality of ratings of the first entity in relation to the second entities and that has a predictive accuracy resulting from being tested against testing data, if additional ratings of the first entity in relation to a plurality of second entities were obtained, by:
removing a number of the ratings of the first entity in relation to the second entities from the training data;
constructing a reduced collaborative filtering model from the training data from which the number of the ratings have been removed;

testing the reduced collaborative filtering model against the testing data to determine a predictive accuracy thereof;

determining the expected improvement based on a degradation of the predictive accuracy of the reduced collaborative filtering model compared to the predictive accuracy of the collaborating filtering model;

selecting by a computing device particular first entities from the subset of the first entities of which to obtain the additional ratings in relation to the second entities, based at least on the expected improvements that have been determined; and obtaining a number of the additional ratings of the particular first entities in relation to the second entities based on the number of the ratings that were removed from the training data.

* * * * *